US010629058B1

(12) United States Patent
Nengelken

(10) Patent No.: US 10,629,058 B1
(45) Date of Patent: Apr. 21, 2020

(54) LOSS RECOGNITION SYSTEM

(71) Applicant: Michael Nengelken, Köln (DE)

(72) Inventor: Michael Nengelken, Köln (DE)

( * ) Notice: Subject to any disclaimer, the term of this patent is extended or adjusted under 35 U.S.C. 154(b) by 0 days.

(21) Appl. No.: 16/371,667

(22) Filed: Apr. 1, 2019

(51) Int. Cl.
G08B 1/08 (2006.01)
G08B 21/24 (2006.01)
F41C 33/04 (2006.01)
F41C 33/02 (2006.01)
G06K 9/00 (2006.01)

(52) U.S. Cl.
CPC .......... *G08B 21/24* (2013.01); *F41C 33/0209* (2013.01); *F41C 33/041* (2013.01); *G06K 9/00006* (2013.01)

(58) Field of Classification Search
CPC .... G08B 21/24; F41C 33/041; F41C 33/0209; G06K 9/00006
USPC .................................................... 340/539.32
See application file for complete search history.

(56) References Cited

U.S. PATENT DOCUMENTS

| 5,915,936 | A | 6/1999 | Brentzel |
| 6,788,199 | B2 * | 9/2004 | Crabtree ................... G01S 3/54 340/539.13 |
| 2005/0262751 | A1 | 12/2005 | Leslie |
| 2010/0019920 | A1 * | 1/2010 | Ketari ................ G08B 13/1427 340/686.6 |
| 2012/0225633 | A1 * | 9/2012 | Nichols .............. G08B 13/1427 455/404.1 |
| 2015/0242665 | A1 * | 8/2015 | Antonescu ......... G06K 19/0724 340/8.1 |

FOREIGN PATENT DOCUMENTS

| DE | 10102283 A1 | 9/2001 |
| DE | 11 2004 001 396 T2 | 6/2006 |
| DE | 10 2008 006 044 A1 | 8/2009 |
| DE | 20 2011 103 913 U1 | 10/2011 |
| DE | 10 2013 021 788 A1 | 6/2014 |
| WO | 2009/075765 A1 | 6/2009 |

* cited by examiner

*Primary Examiner* — Tanmay K Shah
(74) *Attorney, Agent, or Firm* — Renner, Otto, Boisselle & Sklar, LLP

(57) ABSTRACT

A loss recognition system including a transceiver which is prepared to send an interrogation signal to a transponder and to receive from the transponder a response signal. A data processing apparatus detects the presence of the response signal and the signal strength thereof and, in the absence of the response signal or in the case of undershooting of the signal strength of the response signal below a predetermined threshold value, automatically outputting an activation pulse for activating an alarm transmitter associated with the response signal. The transponder is associated with a predetermined object of value and is attached thereto in a use state. An alarm transmitter is provided on the transceiver and/or on the object of value associated with the respective transponder. At least one alarm transmitter is activated by a self-latching circuit which is activated as soon as an activation pulse associated with the alarm transmitter is output.

18 Claims, 4 Drawing Sheets

LOSS RECOGNITION SYSTEM

The present application is related to German patent application No. 10 2016 013 888 filed on Nov. 21, 2016 by the applicant and published on May 24, 2018, the application and publication being hereby incorporated by reference in their entireties.

The present invention relates to a loss recognition system as claimed in the preamble of the main claim.

Loss recognition systems of this kind are in general known from the prior art.

DE 20 2011 103 913 U1 describes a mobile electronic property protection system, which is formed from a plurality of electronic transmission and reception systems. To this end, a first part is located on a person. A second part is located on the object to be protected. The first part continuously identifies the distance from the second part and compares said distance with two or more prescribed distance lengths. When the two components exceed the distance with respect to the first measure of length of a distance length, an alarm in the form of a vibration alarm or an acoustic or visual alarm is first triggered at the first part. When the measure of length of the second prescribed distance length is exceeded, a loud acoustic signal is additionally triggered at the second part.

DE 10 2008 006 044 A1 describes a monitoring system for loss recognition with respect to at least one object to be monitored, said monitoring system comprising a monitoring apparatus, which is carried on or in the human or animal body, and a transponder, which is connected to the object to be monitored. The monitoring apparatus has a transceiver, which is prepared for wireless transmission of an excitation signal to the transponder and for wireless reception of a response signal associated with the excitation signal from the transponder. The monitoring device has an alarm apparatus, which is designed to trigger an alarm when an expected response signal is absent or a signal strength is below a prescribed signal strength value in order to signal a loss of the object to be monitored.

DE 2013 021 788 A1 describes a housing or a shell having a holding system for mobile terminals. The housing or the shell has a device that has electric shock contacts and generates an electric shock, said device serving to ward off unauthorized users and to make theft more difficult.

Documents WO 2009/075765 A1, DE 112004001396 T2, US 2005/0262751 A1, U.S. Pat. No. 5,915,936 A, DE 202011103913 U1 and DE 10102283 A1 also describe further loss recognition systems and security systems.

The object of the invention is to configure triggering, performance and termination of an alarm case in loss recognition systems of the type mentioned at the beginning in a more reliable manner.

The invention achieves this object by way of the features of the main claim.

According to the invention, at least one alarm transmitter is activated by means of an associated self-latching circuit, which is activated as soon as an activation pulse associated with the respective alarm transmitter is output.

The invention has recognized that a particular feature of a self-latching circuit consists in the fact that, by way of said self-latching circuit, a first circuit can be used separately from a second circuit in order, for example, to actuate electrical alarm transmitters in the second circuit by way of switching elements within the first circuit. The two circuits can possibly be connected to one another in a high-impedance manner or, in the preferred case, can also be embodied in a manner DC-isolated from one another.

In particular, DC isolation of the two circuits can reduce effects or disturbances on the loss recognition system according to the invention due to electromagnetic sources, as a result of which the transmission between a respective transceiver and an associated transponder is configured in a more reliable manner. It can be assumed that triggering and performance of an alarm case are therefore more reliable.

Within a first control circuit, the interrogation and response signals can be processed by means of the data processing apparatus and a respective activation pulse can be electrically transmitted to a switching element incorporated in the first control circuit for activating an associated alarm transmitter. Within a second operating circuit, a respective alarm transmitter, which is fed by means of its own energy source separated from the first control circuit, for example a rechargeable battery, can be incorporated.

For example, at least two electrodes can serve as alarm transmitters, said electrodes being located on a predetermined outer surface of an object of value to be protected and being connected to the second operating circuit. In this case, the invention makes provision for the energy source of the operating circuit to be formed by a pulse current source, which is electrically conductively connected to the electrodes.

The pulse current source can be formed by a rechargeable battery or a battery with a low voltage (for example 1.5 V to 12 V), which, owing to its separated position in the second operating circuit of the self-latching circuit independently of other electrical loads, such as, for example, the data processing apparatus, can serve purely for forming a pulse current with a prescribable pulse frequency and pulse energy of the individual pulses and is preferably used accordingly for this sole purpose. The battery voltage or the rechargeable battery voltage is electronically switched on and off at a prescribable speed in order to generate, through induction, a high voltage in the kilovolt range at the electrodes in the alarm case.

If an alarm case arises, a high-voltage pulse is switched to the electrodes by means of the respective self-latching circuit associated with the alarm transmitter, said high-voltage pulse causing an electric shock to occur automatically when the object of value is moved away from a predetermined monitoring zone by an unauthorized person using their bare hands. In the ideal case, that is to say when an electrically conductive connection exists between the palm of the person and the electrodes, the person is made to let go of the object of value due to the electric shock associated therewith. Since, in particular, purse thieves and pickpockets predominantly pursue their criminal activity with their bare hands to ensure a certain tact so that their personal risk of being caught is minimized, the ideal case can usually be assumed here.

The invention expediently makes provision for the electrodes to be attached to the respective object of value on that surface that typically serves as a handle surface for the respective object of value and that is in contact with the palm of the respective user during use thereof as intended. For example, in the case of a pistol as the object of value, the handle surface of its pistol handle would be particularly suitable for attaching the electrodes; in the case of a purse with carrying handles as the object of value, the outer surface of the carrying handles would be particularly suitable as a handle surface, etc.

It is conceivable here for the pulse frequency and the respective electrical energy of the individual pulses to be matched to one another so that a movement-restricting and/or paralyzing effect is applied in the case of such a suspected thieving person in the alarm case, with the result that less resistance is to be expected from the person when the object of value is secured. And even in the case of the person being seized, less resistance can possibly be expected, which makes the alarm case or the alarm situation safer on the whole for all those involved.

The invention furthermore makes provision here for the pulse frequency and the energy of the individual pulses to be below a threshold value, which ensures that such an electric shock does not have life-threatening effects on a person.

In an alarm case, an alarm transmitter can be activated in a reliable and permanent manner by means of the self-latching circuit, wherein it is possible to design the self-latching circuit to be able to be interrupted by means of an OFF switch in order to be able to interrupt the activated alarm transmitter and the effects thereof on the environment, whether it be, depending on the embodiment of the alarm transmitter, for example, as an acoustic alarm transmitter, a piercing alarm tone, or, for example as an optical alarm transmitter, a light signal with a high stimulation effect. This is proposed, in particular, for an alarm transmitter embodied as electrodes in order not to afflict a suspected thief unnecessarily with current surges but to afflict them at most until the situation is under control with the securing of the object of value or with the seizing of the suspected thief.

In order to ensure that only an authorized person can interrupt an alarm, the invention proposes that the OFF switch can be switched only by means of a key. Only those in possession of the key can interrupt the alarm.

There are many conceivable options for realizing an OFF switch that can be switched by means of a key.

For example, a fingerprint of a person authorized to use the respective object of value can serve as a key, said fingerprint being stored in terms of data technology within the data processing apparatus. In this case, it is proposed that the OFF switch can be switched by means of a fingerprint sensor, which is connected to the data processing apparatus. In a particularly simple, preferred case, the OFF switch can be formed by a button embedded within a housing, as is the case, for example, in the case of a reset button on desktop computers. Here, the key can have a toothpick-like shape in order to be able to actuate the OFF switch reliably. Such a button can be identified by an uninitiated person only with difficulty owing to the in-built nature thereof and can be actuated using the simplest key-like means. A button provided as an OFF switch can also be embodied with a cover as a covered button in order to hide its existence from uninitiated persons.

The transceiver and the data processing apparatus together with at least one self-latching circuit coupled to the data processing apparatus can be housed within a housing that can be carried by a person. It would be conceivable here for at least one transponder to be able to be inserted into the housing in a storage state by means of a connecting apparatus, for example a slide-in compartment or a latching connection for the transponder, provided on the housing. The transponder may have electrical contacts, for example plug contacts, which are connected to mating contacts on the housing in the storage state. In this case, the contacts can serve as a key in order to terminate an alarm again. If the transponder has a rechargeable battery for its own energy supply, the contacts can furthermore also make it possible for the rechargeable battery to be able to be charged, for example by means of a USB port provided on the housing, in the storage state of the transponder. In addition to the rechargeable battery of the respective transponder, a rechargeable battery associated with the transceiver of the housing can be charged by means of the USB port.

The transponder that can be inserted respectively into the housing can be embodied as a loose transponder, which can be connected to the respective object of value in a reversible manner in the respective use state, for example, by way of an adhesive tape, a Velcro tape, a keyring or by way of loose attachment in a compartment of the object of value, such as, for example, the coin pocket of a wallet. The loose transponder can then be activated automatically for the alarm case as intended as soon as said transponder is taken out of the storage state, for example when the electrical contacts thereof described above lose the connection to the mating contacts on the housing when taken out.

Furthermore, the self-latching circuit has an ON switch, which can be switched by means of the respective activation pulse associated with the self-latching circuit. The ON switch can be formed, for example, by an electromagnetic switch (relay) or an electronic switch (diode switch). For both switch types, it is possible for them to be able to be actuated by the data processing apparatus.

The transceiver and the data processing apparatus together with at least one self-latching circuit coupled to the data processing apparatus are preferably housed within a housing that can be carried by a person. The self-latching circuit can be used, for example, as a superordinate self-latching circuit in order, in an alarm case, on the one hand to actuate a first alarm transmitter attached to the housing and on the other hand, by way of the activation thereof, to set a programmed flag within the data processing apparatus by means of a program stored in the data processing apparatus, the setting of which is a prerequisite for a respective further alarm transmitter to be activated on an object of value being able to be activated in the alarm case at all.

The carrier of the housing can in this case first be warned that a possible alarm case exists, for example by way of an inconspicuous vibration alarm on the housing, with the result that they still have time to assess the situation correctly before possibly permitting activation of an alarm transmitter on an object of value.

To this end, it is already sufficient, for example, to set a normally open contact within a respective operating circuit of a respective alarm transmitter, the activation of which normally open contact is dependent on the setting of the flag. The normally open contact is connected to the data processing apparatus in an actuatable manner for automatic actuation.

It is also possible to provide a single self-latching circuit as superordinate self-latching circuit within the housing, upon the activation of which the flag is set within the data processing apparatus, wherein all further activations of the respective alarm transmitter present on the objects of value can take place by means of programmed flip-flops depending on the set flag by means of the software program stored within the data processing apparatus.

The measure with the flag set by means of the self-latching circuit in the alarm case ensures that the carrier of the housing has the option, directly on the housing, to interrupt an alarm transmitter possibly activated on the respective object of value at any time by actuating the OFF switch, since the flag is then removed and a power supply to the respective alarm transmitter is interrupted with the dropout of the superordinate self-latching circuit. In this case, the respective activation of all alarm transmitters located on objects of value and associated with the loss recognition system according to the invention is preferably dependent on an activated superordinate self-latching circuit in the housing.

The housing can be embodied as a separate housing, wherein said housing has a fastening apparatus, which can be used to attach said housing to a predetermined item of clothing. For example, the housing can be formed by a belt buckle of a trouser belt. However, the housing can also be formed, for example, by a piece of jewellery such as, for example, a bracelet or a pendant.

A further example for a separate housing would be that the housing is a constituent part of a holster for a gun. If the object of value is formed by a firearm that can be inserted into the holster, the holster and the firearm are coupled to one another in accordance with the invention. If the gun is removed from the respective monitoring radius, an alarm is effected at the housing or at the gun through activation of the respective alarm transmitter. Said alarm may be, in addition to or as an alternative to electric shock contacts, for example, a loudspeaker for a piercing alarm tone at the gun.

The housing can have function buttons. By means of the function buttons, for example, the volume of an alarm tone can be selectable or the type of alarm such as, for example, a silent vibration alarm or an acoustic, loud alarm. Furthermore, it is possible to provide function buttons that can be used to select respectively different threshold values for a minimum signal strength of a respectively associated response signal, said threshold values being able to be preset within the data processing apparatus. Using this measure, the carrier of the housing can react to various area situations that could have an influence on a signal strength. This may be the case, for example, when the area in which the carrier of the housing is located changes from a non-built-up, open area to a built-up area with numerous electromagnetic sources of disturbance and/or the carrier enters a building.

The monitoring radius can be influenced by means of the function buttons with selection of the threshold value. It is also possible here for the carrier of the housing to react to various situations, for example, to select a larger monitoring radius when an object of value that is carried along by the carrier of the housing is put down and said user wishes to move further away from the object of value than a current monitoring radius allows without triggering an alarm.

The monitoring radius that can be selected by means of the function buttons can be located, for example, between 1 m and 40 m or between 1.5 m and 20 m, depending on the situation.

With the selection of a transmission technology for realizing a wireless connection between the transceiver and the respective transponder thereof, it is furthermore possible to influence a range in which the monitoring radius may be located. To this end, several transmission technologies are known from the prior art in order to realize the above exemplary range for the monitoring radius.

For example, it is possible to operate here using Bluetooth technology or high-frequency technology. High-frequency technology is used, for example, in garage door transmitters. There are a number of further high-frequency solutions in the fields of building and industry automation and in the field of security technology in order to be able to transmit signals between two components in a wireless manner. The high-frequency technology has an advantageously low energy consumption and can be used to realize high distance tolerances in a technically simple manner.

The transponders used can be, for example, passive or active RFIDs, which can be programmed with low expenditure. The data processing apparatus can be programmable, for example, by means of the transceiver using an application of a cell phone or tablet PC or the like with low expenditure in order to stipulate and/or modify, for example, threshold values mentioned above. With respect to a reliable and secure performance of an alarm case, with a reduction in risks of manipulation by way of third parties, the invention proposes here for the application to communicate with the data processing apparatus in an encrypted manner.

In the following text, the invention is explained in more detail based on an exemplary embodiment.

Unless otherwise stated in the following text, the following description always applies for all of the figures.

Figure 1:
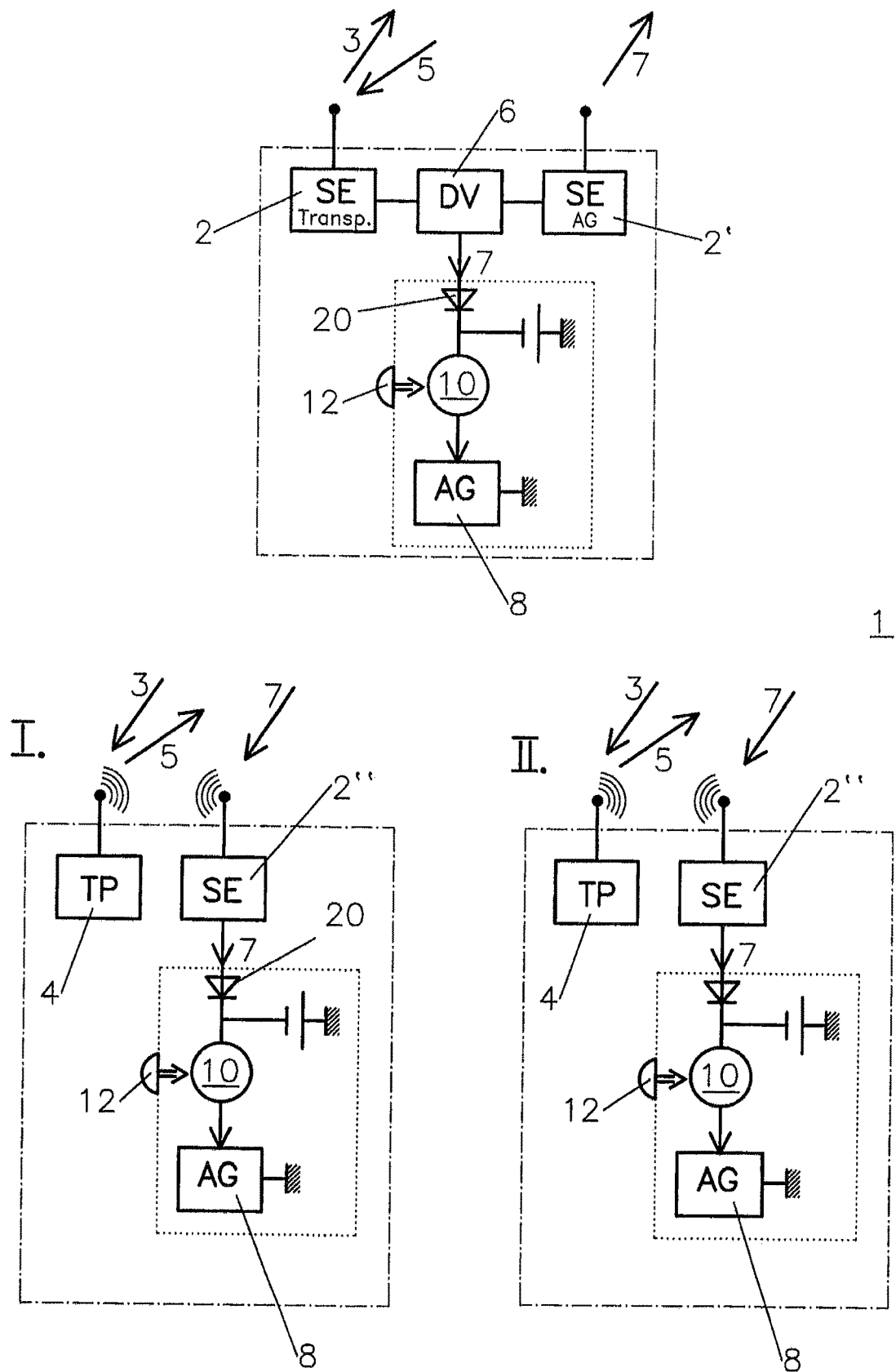
FIG. 1 shows a schematic illustration of the loss recognition system according to the invention.

In particular, FIG. 1 shows a schematic illustration of a loss recognition system 1 according to the invention.

The loss recognition system 1 comprises a transceiver 2, which is prepared to send a respective interrogation signal 3 to a respectively associated transponder 4 and to receive from the transponder 4 a response signal 5 associated with the interrogation signal 3. The transceiver 2 is housed within a housing 15.

In the case shown, two transponder systems I and II that are identical with respect to their function scheme and each have a transponder 4 are illustrated by way of example. The respective transponder systems I and II furthermore comprise a transceiver 2", which serves to receive an activation signal 7, and a respectively associated alarm transmitter 8, which is activated by an associated activation signal 7 in the alarm case. The respective transponder system I and II is a constituent part of a respectively associated object of value 9, illustrated in particular in FIG. 2, and is attached or connected to said object of value in a use state. The connection can be embodied to be irreversible or reversible. The number of transponder systems is determined by the number of objects of value 9 to be protected within the loss recognition system 1.

Figure 2:
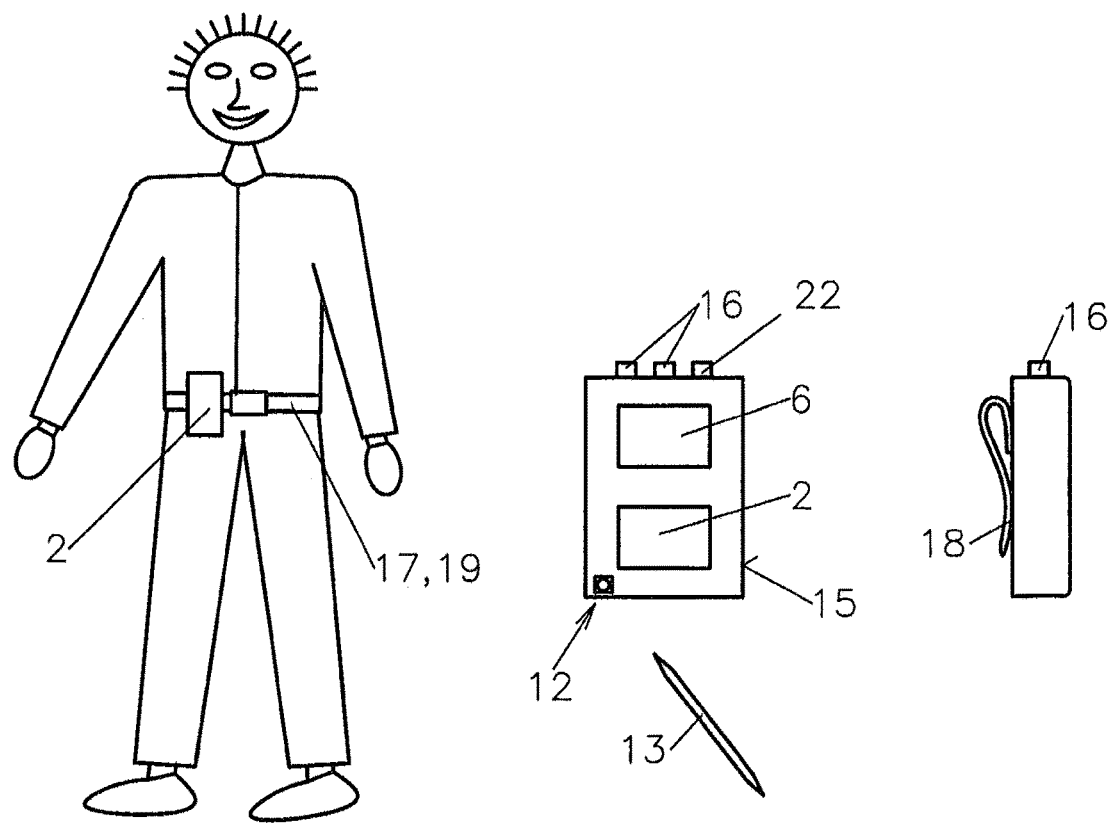
FIG. 2 shows the loss recognition system according to the invention in the use state.
Figure 2:
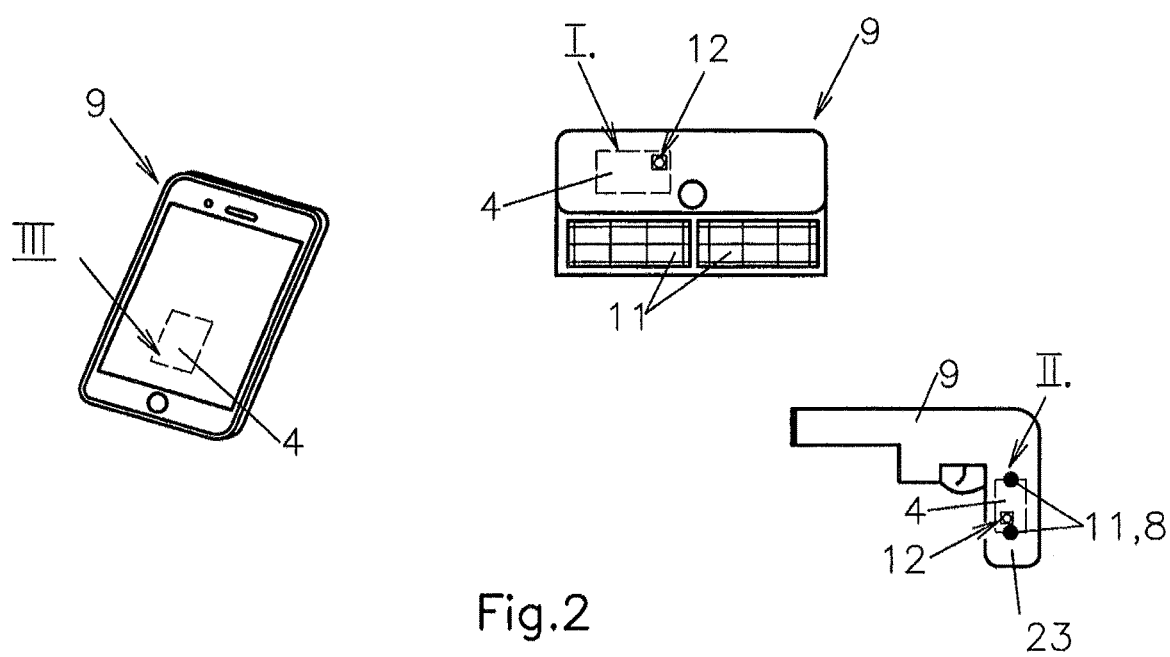

In the example shown in FIG. 2, the first transponder system I according to FIG. 1 is a constituent part of a purse, which constitutes a first exemplary object of value 9, and the second transponder system II according to FIG. 1 is a constituent part of a firearm, which constitutes a second exemplary object of value 9. FIG. 2 furthermore shows that a third transponder system III consisting of a simple RFID chip as transponder 4 is used. The transponder 4, or the RFID chip, is adhesively bonded on the rear side of a cell phone, which constitutes by way of example a third object of value 9.

FIG. 1 furthermore shows that the transceiver 2 is associated with a data processing apparatus 6 likewise housed in the housing 15, said data processing apparatus detecting the presence of the respective response signal 5 and the signal strength thereof and, in the absence of the response signal 5 or in the case of undershooting of the signal strength of the response signal 5 below a predetermined threshold value, automatically outputting an activation pulse 7 for activating an alarm transmitter 8 associated with the respective response signal 5.

Figure 3:
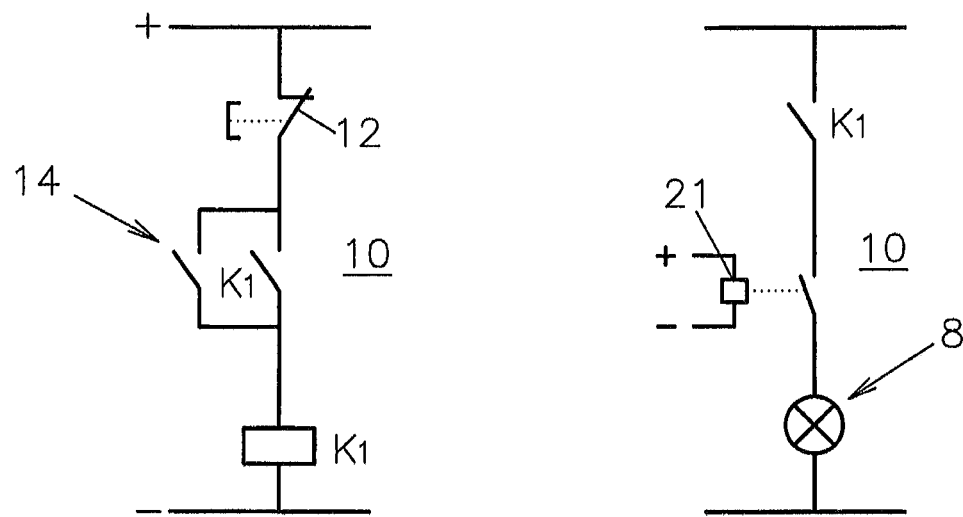
FIG. 3 shows a first self-latching circuit with an associated alarm transmitter.
Figure 4:
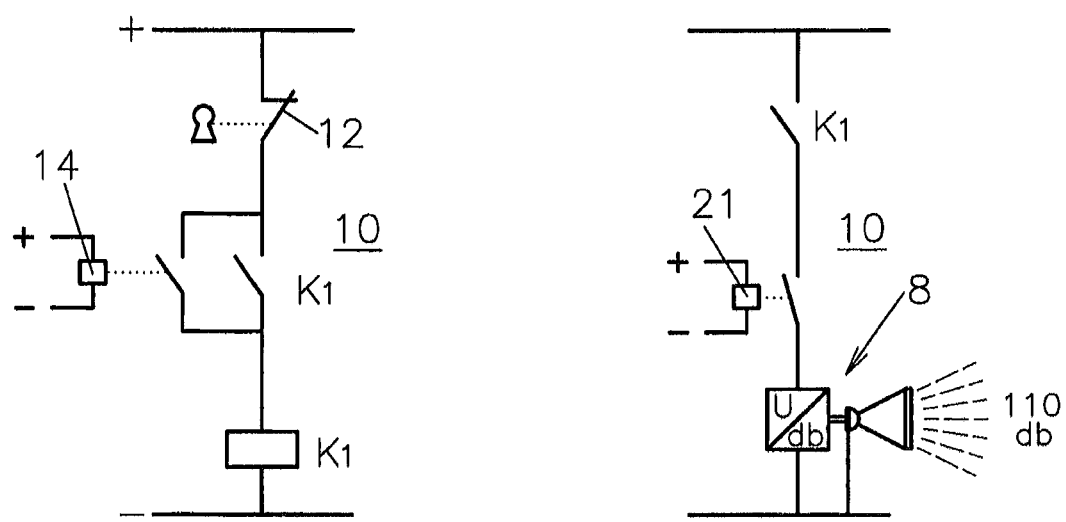
FIG. 4 shows a second self-latching circuit with an associated alarm transmitter.

A first alarm transmitter 8 is housed in the housing 15. According to the invention, the first alarm transmitter 8 is activated by means of an associated self-latching circuit 10 likewise housed in the housing 15, said self-latching circuit being activated as soon as an activation pulse 7 associated with the respective alarm transmitter 8 is output by the data processing apparatus 6. The self-latching circuit 10 housed in the housing 15 is superordinate to the self-latching circuits 10 as illustrated, in particular, in FIGS. 3 and 4. FIGS. 3 and 4 illustrate that, with activation of the superordinate self-latching circuit 10 by the data processing apparatus 6, a signal is output to activate a normally open contact 21 so that an activation of the respective alarm transmitter 8 of the subordinate self-latching circuits 10 according to FIGS. 3 and 4 is dependent on the activated normally open contact 21. The respective normally open contact 21 is located in the operating circuit of the respective self-latching circuit 10.

The exemplary alarm transmitter 8 that can be activated by the self-latching circuit 10 according to FIG. 3 is a light-emitting diode and the exemplary alarm transmitter 8 that can be activated by the self-latching circuit according to FIG. 4 is a loudspeaker for a piercing alarm tone.

A further transceiver 2' is associated with the data processing apparatus 6 shown in the housing 15 according to FIG. 1, said further transceiver serving to transmit the activation pulses 7 associated with the respective self-latching circuits 10 of the transponder systems I and II and communicating by radio technology with a transceiver 2" integrated on the respective transponder system I and II for this purpose. The transceiver 2' likewise serves for transmission and the transceiver 2" likewise serves to receive signals for activating or deactivating respectively associated normally open contacts 21 according to FIGS. 3 and 4.

The function of the first and second transceiver 2, 2' can also be combined within one single transceiver.

The transponder systems I and II each have a self-latching circuit 10 according to the invention, which can be used to activate an alarm transmitter 8. With respect to the activation pulse 7, all of the self-latching circuits 10 illustrated in FIG. 1 have a diode 10 on the input side as a protective measure. Other comparable electronic components or possibly a provided computer program that can be stored, for example, in the data processing apparatus can also serve as a protective measure.

FIG. 4 illustrates, in particular, a self-latching circuit 10 used in accordance with the invention, said self-latching circuit being able to be interrupted by means of an OFF switch 12, which can be switched by means of a key 13. The OFF switch is located in the control circuit of the self-latching circuit 10.

FIG. 2 illustrates, in particular, that the key 13 can have a toothpick-like shape. To this end, the OFF switch 12 can be embedded in the housing 15 in such a way that said OFF switch can be actuated only by way of a pointed object, such as a toothpick, for example.

FIG. 4 furthermore shows, in particular, a self-latching circuit 10, which has an electromagnetic ON switch 14, which can be switched by means of the respectively associated activation pulse 7.

FIG. 2 shows that the transceiver 2 and the data processing apparatus 6 together with at least one self-latching circuit 10 coupled to the data processing apparatus 6 are housed within a housing 15 that can be carried by a person. The housing 15 has on its rear side a fastening apparatus 18 in the form of a clip, which can be used to attach the housing 15 to a trouser belt 17.

The housing 15 is therefore embodied as a separate housing 15 in order to attach it using the fastening apparatus 18 to a separate item of clothing 19, such as the shown trouser belt 17, for example.

The housing can also be a constituent part of the trouser belt 17 by virtue of it being formed, for example, by the belt buckle of the trouser belt 17.

In FIG. 2, one of the objects of value 9 protected in accordance with the invention is a pistol or a firearm. It is conceivable here for the housing 15 to be an integral constituent part of a holster associated with the firearm.

The housing 15 illustrated in FIG. 1 has function buttons 16, which can be used to select respectively different threshold values for a minimum signal strength of a respectively associated response signal 5, said threshold values being able to be preset within the data processing apparatus 6. In addition thereto, a regulation apparatus, in this case in the form of a potentiometer 22, is attached to the housing 15, said regulating apparatus being used to regulate the transmission power of the respective transceivers 2, 2' and 2". It is possible to influence a preferred monitoring radius using both of these measures. In the example shown, a first exemplary monitoring radius of 1.5 m is set, a first alarm transmitter 8, selected for example as a vibration motor, on the housing 15 being activated by means of the superordinate self-latching circuit 10 when said monitoring radius is exceeded. The user is then made aware of the fact that one or more of the objects of value 9 are located outside of a preferred storage region. The activation ability of the alarm transmitters 8 associated with the respective objects of value 9 is then enabled by setting a flag within the data processing apparatus 6 by means of a program stored there. When a second monitoring radius of, for example, 20 m is exceeded, an activation pulse 7 is automatically transmitted from the data processing apparatus 6 to the respective transponder system I or II of the object of value 9 in order to activate the alarm transmitter 8 thereof. The alarm transmitter 8 activated in the alarm case remains activated up to a manual switch-off, even when the object of value 9 is located in the monitoring radius again.

Both the purse and the firearm according to FIG. 2 in this case have at least two electrodes 11 as alarm transmitters 8 on the outer surface of said objects of value, between which electrodes a high-voltage pulse can be switched by means of the respective self-latching circuit associated with the alarm transmitter 8.

The electrodes 11 are attached to the respective object of value 9 on that outer surface that typically serves as a handle surface for the respective object of value 9 and that is in contact with the palm of the respective user during use thereof as intended.

In the case of the firearm, this is the handle surface thereof and in the case of the purse, two large-area outer material regions in which a respective inconspicuous wire mesh is incorporated or braided or sewn-in to form the respective electrode 11.

Figure 5:
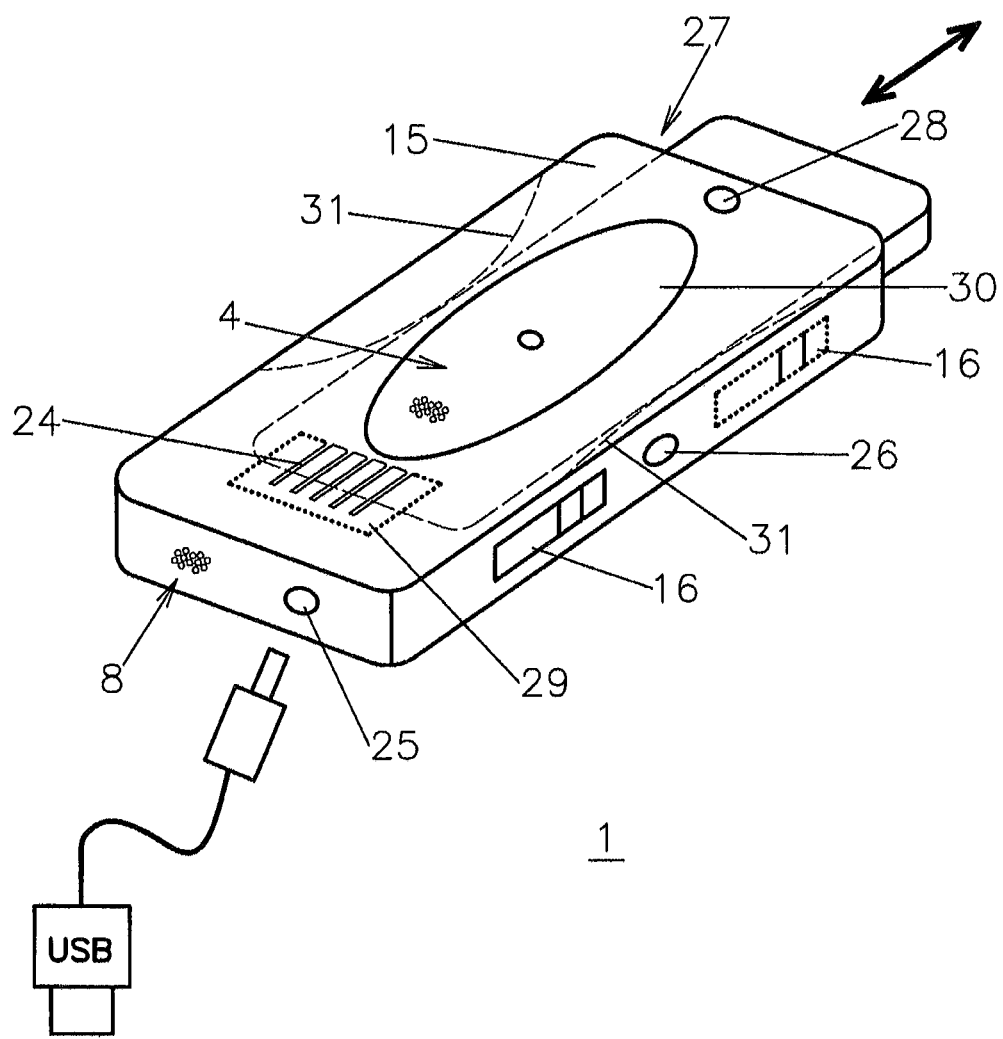
FIG. 5 shows a further example for a loss recognition system according to the invention in a storage state.

FIG. 5 shows, in particular, a separate housing 15 in which at least one transponder 4 can be inserted into the housing 15 in a storage state by means of a connecting apparatus 27 provided on the housing 15. In this case, the connecting apparatus 27 is formed by an opening having clamping brackets 31, into which opening the transponder 4 can be slotted. The transponder 4 is held by the clamping brackets 31 in the storage state.

In the use state, the transponder 4 can be attached in a reversibly releasable manner to associated objects of value 9.

The transceiver 2 and the transponder 4 can be carried along as one unit in the storage state. Both devices (housing 15, transponder 4) have rechargeable batteries, which can be charged simultaneously by means of a USB cable in the storage state. To this end, the housing 15 has a USB port 25, to which the USB cable can be connected. The transponder 4 has an electrical plug contact 24, which is connected to a mating plug contact 29 on the housing 15 in the storage state. As soon as the transponder 4 is taken out of the housing 15 so that the connection of the plug contacts 24, 29 is interrupted, the alarm function of the loss recognition system 1 according to the invention is activated automatically. When an alarm is triggered, this can be interrupted as soon as the connection of the plug contacts 24, 29 is closed again by slotting the transponder 4 back into the housing 15.

The housing 15 has at least one LED light 25, which serves to indicate various operating states of the loss recognition system 1. For example, in order to indicate, by means of coloration, light intervals or by means of on and off states, whether the rechargeable batteries are charged or are charging, the alarm function is armed or the loss recognition system 1 is turned off.

The housing 15 has an opening 30 for easily sliding out the transponder 4.

The housing 15 has a hole 28, which is coincident with a hole on the transponder 4 in the storage state, in order to attach, for example, a common keyring or carabiner to both parts.

The housing 15 consists of a breakproof plastic and has rounded edges. The respective function buttons 16 are embedded in the housing 15.

The term "interrogation signal" used in the present application is to be understood in the meaning of a "request signal" or a "prompt signal". The term "undershooting" below a threshold value used in the present application is to be understood in the meaning of "fall below" a threshold value. Furthermore, the term "self-latching circuit" used in the present application is to be understood in the meaning of a "self-maintaining relay" or a "self-maintaining circuit".

LIST OF REFERENCE SIGNS

1 Loss recognition system
2 Transceiver
2' Transceiver
2" Transceiver
3 Interrogation signal
4 Transponder
5 Response signal
6 Data processing apparatus
7 Activation pulse
8 Alarm transmitter
9 Object of value
10 Self-latching circuit
11 Electrode
12 OFF switch
13 Key
14 ON switch
15 Housing
16 Function button
17 Trouser belt
18 Fastening apparatus
19 Item of clothing
20 Diode
21 Normally open contact
22 Potentiometer
23 Handle
24 Plug contact
25 USB port
26 LED light
27 Connecting apparatus
28 Hole
29 Mating plug contact
30 Opening
31 Clamping bracket
I Transponder system
II Transponder system
III Transponder system

The invention claimed is:

1. A loss recognition system, comprising
a transceiver, which is prepared to send a respective interrogation signal to a respectively associated transponder and to receive from the transponder a response signal associated with the interrogation signal, and
a data processing apparatus is-associated with the transceiver, said data processing apparatus being configured to detect the presence of the respective response signal and the signal strength thereof and, in the absence of the response signal and/or in the case of undershooting of the signal strength of the response signal below a predetermined threshold value, to automatically output an activation pulse for activating an alarm transmitter associated with the respective response signal,
wherein the respective transponder is associated with a respectively predetermined object of value and is fixedly attached thereto,
wherein a respective alarm transmitter is provided on the object of value associated with the respective transponder,
wherein at least one alarm transmitter is activated by an associated self-latching circuit, which is activated as soon as an activation pulse associated with the respective alarm transmitter is output,
wherein the self-latching circuit has a first control circuit, which has a switching element to which the activation pulse can be transmitted, and
wherein the self-latching circuit has a second operating circuit in which the alarm transmitter is integrated, wherein the self-latching circuit can be interrupted by an OFF switch, which can be switched by a key.

2. The loss recognition system according to claim 1, wherein the key is formed by a fingerprint stored within the data processing apparatus, and the OFF switch and the data processing apparatus are connected to a fingerprint sensor.

3. The loss recognition system according to claim 1, wherein the key has a toothpick-like shape.

4. The loss recognition system according to claim 1, wherein the self-latching circuit has an electronic ON switch, which can be switched by the respectively associated activation pulse.

5. The loss recognition system according to claim 1, wherein the transceiver and the data processing apparatus together with at least one self-latching circuit coupled to the data processing apparatus are housed within a housing that can be carried by a person.

6. The loss recognition system according to claim 5, wherein the housing is formed by a belt buckle of a trouser belt.

7. The loss recognition system according to claim 5, wherein the housing is a constituent part of a holster for a gun.

8. The loss recognition system according to claim 5, wherein the housing is embodied as a separate housing, wherein said housing has a fastening apparatus, which can be used to attach said housing to a predetermined item of clothing.

9. The loss recognition system according to claim 5, wherein the housing has function buttons, which can be used to select respectively different threshold values for a minimum signal strength of a respectively associated response signal, said threshold values being able to be preset within the data processing apparatus.

10. The loss recognition system according to claim 1, wherein at least one object of value has at least two electrodes as alarm transmitters on the outer surface of said object of value, between which electrodes a high-voltage pulse can be switched by the respective self-latching circuit associated with the alarm transmitter.

11. The loss recognition system according to claim 10, wherein the electrodes are attached to the respective object of value on that outer surface that typically serves as a handle surface for the respective object of value and that is in contact with the palm of a respective user during use thereof as intended.

12. The loss recognition system according to claim 1, wherein the object of value is formed by a firearm.

13. The loss recognition system according to claim 12, wherein the firearm has a handle in which a pulse current source is incorporated.

14. The loss recognition system according to claim 1, wherein the respective operation of all alarm transmitters located on objects of value and associated with the loss recognition system according to the invention is dependent on an activated superordinate self-latching circuit in the housing.

15. The loss recognition system according to claim 1, wherein the key is realized by at least an electrical plug contact.

16. The loss recognition system according to claim 1, wherein at least one transponder can be inserted into the housing in a storage state via a connecting device provided on the housing.

17. The loss recognition system according to claim 1, wherein the respective transponder has a rechargeable battery which can be charged in the storage state of the transponder via a USB connection provided on the housing.

18. The loss recognition system according to claim 1, wherein a battery assigned to the transceiver of the housing can be charged via the USB connection in addition to the battery of the respective transponder.

* * * * *